United States Patent
Hashimoto

(10) Patent No.: US 11,180,903 B2
(45) Date of Patent: Nov. 23, 2021

(54) CONTROL SYSTEM FOR WORK VEHICLE, METHOD, AND WORK VEHICLE

(71) Applicant: KOMATSU LTD., Tokyo (JP)

(72) Inventor: Kazuhiro Hashimoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 172 days.

(21) Appl. No.: 16/612,231

(22) PCT Filed: Aug. 28, 2018

(86) PCT No.: PCT/JP2018/031752
§ 371 (c)(1),
(2) Date: Nov. 8, 2019

(87) PCT Pub. No.: WO2019/044822
PCT Pub. Date: Mar. 7, 2019

(65) Prior Publication Data
US 2021/0148090 A1    May 20, 2021

(30) Foreign Application Priority Data

Aug. 29, 2017    (JP) .............................. JP2017-164214

(51) Int. Cl.
*E02F 9/26*    (2006.01)
*E02F 9/20*    (2006.01)
*G05D 1/02*    (2020.01)

(52) U.S. Cl.
CPC ................ *E02F 9/262* (2013.01); *E02F 9/20* (2013.01); *G05D 1/0268* (2013.01)

(58) Field of Classification Search
CPC ........... E02F 9/20; E02F 9/262; G05D 1/0268
See application file for complete search history.

(56) References Cited

U.S. PATENT DOCUMENTS 5,924,493 A     7/1999  Hartman et al.
6,317,669 B1 *  11/2001 Kurenuma .............. E02F 3/434
                                                         172/2

(Continued)

FOREIGN PATENT DOCUMENTS

JP      8-506870 A    7/1996
JP      10-91059 A    4/1998

(Continued)

OTHER PUBLICATIONS

US 5,526,002 A, 06/1996, Gudat et al. (withdrawn)

(Continued)

*Primary Examiner* — Tyler J Lee
(74) *Attorney, Agent, or Firm* — Global IP Counselors, LLP

(57) ABSTRACT

A control system for a work vehicle includes a storage device and a controller in communication with the storage device. The storage device stores target parameter data defining a relationship between a movement distance of the work vehicle and a target parameter related to a target digging amount of a work implement of the work vehicle. The target parameter data includes digging time data defining a relationship between the movement distance of the work vehicle within a predetermined digging area and the target parameter. The controller determines a target return distance from a distance of the digging area defined in the target parameter data, and determines a position returned from a predetermined reference position by the target return distance as a recommended digging start position.

22 Claims, 16 Drawing Sheets

(56) References Cited

U.S. PATENT DOCUMENTS

| | | | |
|---|---|---|---|
| 9,014,922 B2 | 4/2015 | Edara et al. | |
| 9,256,227 B1 | 2/2016 | Wei et al. | |
| 9,663,921 B2* | 5/2017 | Wei | E02F 9/2054 |
| 10,407,872 B2* | 9/2019 | Wei | E02F 9/205 |
| 2012/0136508 A1* | 5/2012 | Taylor | G05D 1/0274 |
| | | | 701/2 |
| 2013/0081831 A1* | 4/2013 | Hayashi | E02F 3/847 |
| | | | 172/4.5 |
| 2014/0012404 A1 | 1/2014 | Taylor et al. | |
| 2014/0180444 A1 | 6/2014 | Edara et al. | |
| 2014/0277957 A1* | 9/2014 | Clar | E02F 9/2045 |
| | | | 701/50 |
| 2015/0019086 A1* | 1/2015 | Hayashi | E02F 3/844 |
| | | | 701/50 |
| 2016/0040388 A1 | 2/2016 | Kontz et al. | |
| 2016/0040392 A1 | 2/2016 | Kontz | |
| 2016/0040397 A1 | 2/2016 | Kontz | |
| 2016/0069042 A1 | 3/2016 | Wei et al. | |
| 2016/0076223 A1 | 3/2016 | Wei et al. | |
| 2016/0077513 A1 | 3/2016 | Wei et al. | |
| 2016/0077514 A1 | 3/2016 | Taylor et al. | |
| 2017/0009426 A1* | 1/2017 | Wei | E02F 9/2054 |
| 2018/0094408 A1 | 4/2018 | Shintani et al. | |

FOREIGN PATENT DOCUMENTS

| | | |
|---|---|---|
| JP | 2001-303620 A | 10/2001 |
| JP | 2003-239287 A | 8/2003 |
| JP | 5247939 B1 | 7/2013 |
| WO | 2008/118027 A2 | 10/2008 |
| WO | 2017/047826 A1 | 3/2017 |

OTHER PUBLICATIONS

The International Search Report for the corresponding international application No. PCT/JP2018/031752, dated Nov. 13, 2018.

The Office Action for the corresponding Japanese application No. 2017-164214, dated Nov. 17, 2020.

* cited by examiner

CONTROL SYSTEM FOR WORK VEHICLE, METHOD, AND WORK VEHICLE

CROSS-REFERENCE TO RELATED APPLICATIONS

This application is a U.S. National stage application of International Application No. PCT/JP2018/031752, filed on Aug. 28, 2018. This U.S. National stage application claims priority under 35 U.S.C. § 119(a) to Japanese Patent Application No. 2017-164214, filed in Japan on Aug. 29, 2017, the entire contents of which are hereby incorporated herein by reference.

BACKGROUND

Field of the Invention

The present invention relates to a control system for a work vehicle, a method, and a work vehicle.

Background Information

A work vehicle may carry out an operation of digging the surface layer of a path by repeating forward and reverse on the path. For example, the work vehicle starts digging forward from the digging start position on the path. After digging to a certain extent, the work vehicle carries the soil to the soil dump. After that, the work vehicle moves backward and returns to a position retracted from the digging start position. Then, the work vehicle moves forward and starts digging again from the next digging start position.

In the above-described work, the selection of the digging start position affects the work efficiency. However, selection of an appropriate digging start position requires skilled experience, and it is not easy for an operator with little experience to select a suitable digging start position.

Therefore, in U.S. Pat. No. 9,014,922, the controller sequentially moves the digging start position of the target profile on the work ground in calculation, and determines the digging start position to be an appropriate load for the work implement by calculation using the successive approximation method Is described.

SUMMARY

However, in the technique according to U.S. Pat. No. 9,014,922, the computational load of the controller for the successive approximation method for calculating the digging start position may be excessive.

An object of the present invention is to reduce a computational load on a controller as well as to determine an appropriate digging start position by the calculation of the controller.

A first aspect is a control system for a work vehicle having a work implement, and the control system includes a storage device and a controller. The storage device stores target parameter data. The target parameter data defines the relationship between the movement distance of the work vehicle and the target parameter related to the target digging amount of the work implement. The target parameter data includes digging time data indicative of the relationship between the movement distance of the work vehicle within the predetermined digging area and the target parameter. The controller communicates with the storage device. The controller is programmed to perform the following processing. The controller determines a target return distance from the distance of the digging area defined in the target parameter data. The controller determines a position returned from the predetermined reference position by the target return distance as the recommended digging start position.

A second aspect is a method executed by a controller to determine a recommended digging start position of a work vehicle having a work implement. The method includes the following processing. The first process is to refer to target parameter data. The target parameter data defines the relationship between the movement distance of the work vehicle and the target parameter related to the target digging amount of the work implement. The target parameter data includes digging time data that defines the relationship between the movement distance of the work vehicle within the predetermined digging area and the target parameter. The second process is to determine the target return distance from the distance of the digging area defined in the target parameter data. The third process is to determine a position returned from the predetermined reference position by the target return distance as the recommended digging start position.

A third aspect is a work vehicle, and the work vehicle includes a work implement and a controller that outputs a command signal to control the work implement. The controller is programmed to perform the following processing. The controller refers target parameter data. The target parameter data defines the relationship between the movement distance of the work vehicle and the target parameter related to the target digging amount of the work implement. The target parameter data includes digging time data that defines the relationship between the movement distance of the work vehicle within the predetermined digging area and the target parameter. The controller determines a target return distance from the distance of the digging area defined in the target parameter data. The controller determines a position returned from the predetermined reference position by the target return distance as the recommended digging start position.

In the present invention, the controller determines the target return distance from the distance of the digging area, and determines a position returned from the predetermined reference position by the target return distance as the recommended digging start position. Since the distance of the digging area is a distance defined in the target parameter data as the area to be dug, it is possible to determine an appropriate position to start digging as the recommended digging start position. Further, the controller determines a position returned from the predetermined reference position by the target return distance as the recommended digging start position. Therefore, the computational load on the controller can be reduced.

DETAILED DESCRIPTION OF EMBODIMENT(S)

Figure 1:
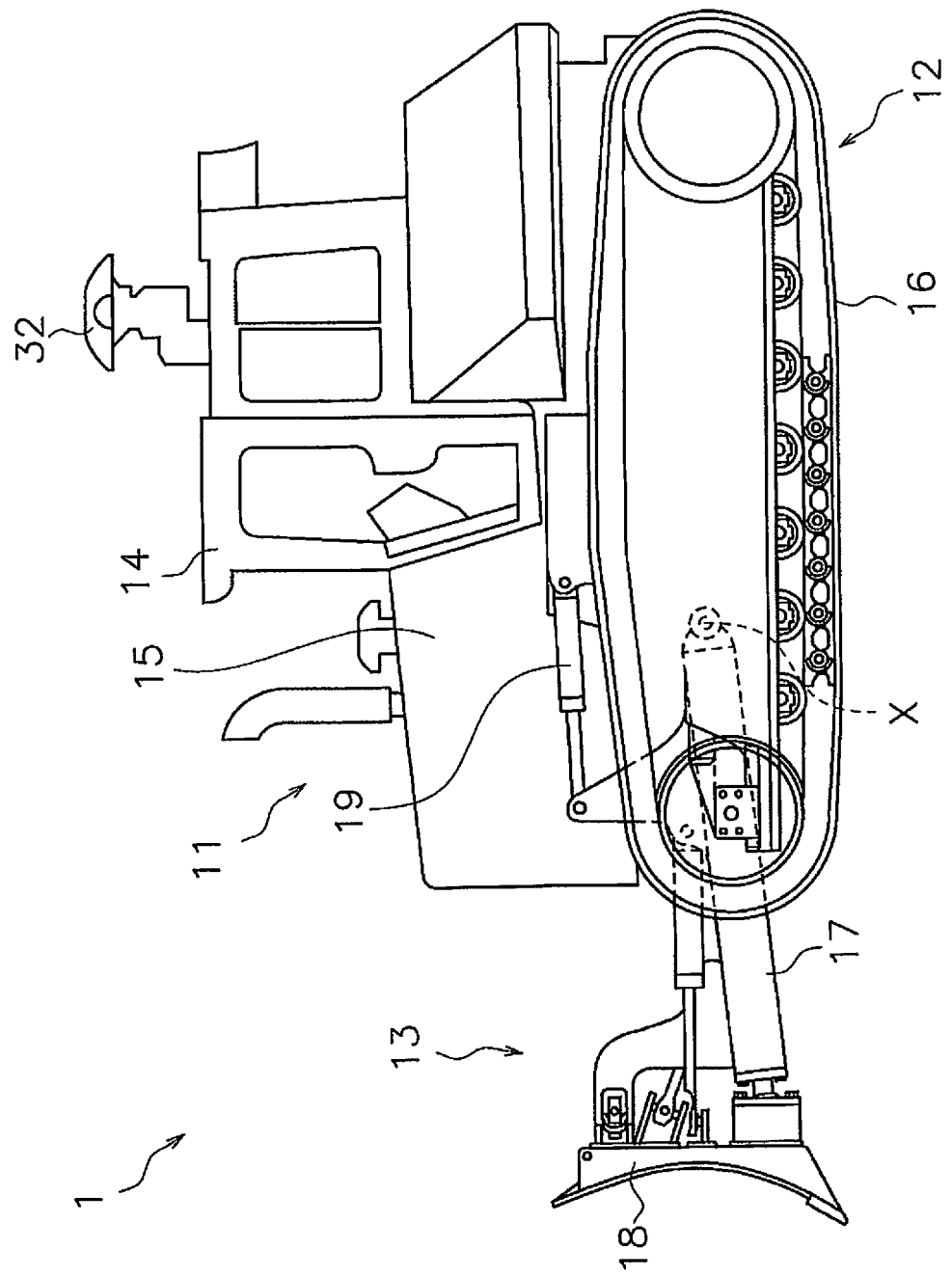
FIG. 1 is a side view showing a work vehicle according to an embodiment.

Hereinafter, a work vehicle according to an embodiment will be described with reference to the drawings. FIG. 1 is a side view showing a work vehicle 1 according to the embodiment. The work vehicle 1 according to the present embodiment is a bulldozer. The work vehicle 1 includes a vehicle body 11, a traveling device 12, and a work implement 13.

The vehicle body 11 has a cab 14 and an engine compartment 15. A driver's seat (not illustrated) is disposed in the cab 14. The engine compartment 15 is disposed in front of the cab 14. The traveling device 12 is attached to the lower part of the vehicle body 11. The traveling device 12 has a pair of right and left crawler belts 16. In FIG. 1, only the left crawler belt 16 is illustrated. As the crawler belts 16 rotate, the work vehicle 1 travels. The traveling of the work vehicle 1 may be any of autonomous traveling, semi-autonomous traveling, and traveling by the operation of the operator.

The work implement 13 is attached to the vehicle body 11. The work implement 13 has a lift frame 17, a blade 18 and a lift cylinder 19.

The lift frame 17 is mounted on the vehicle body 11 so as to be movable up and down about an axis X extending in the vehicle width direction. The lift frame 17 supports the blade 18. The blade 18 is disposed in front of the vehicle body 11. The blade 18 moves up and down as the lift frame 17 moves up and down.

The lift cylinder 19 is connected to the vehicle body 11 and the lift frame 17. The lift frame 17 rotates up and down about the axis X by the expansion and contraction of the lift cylinder 19.

Figure 2:
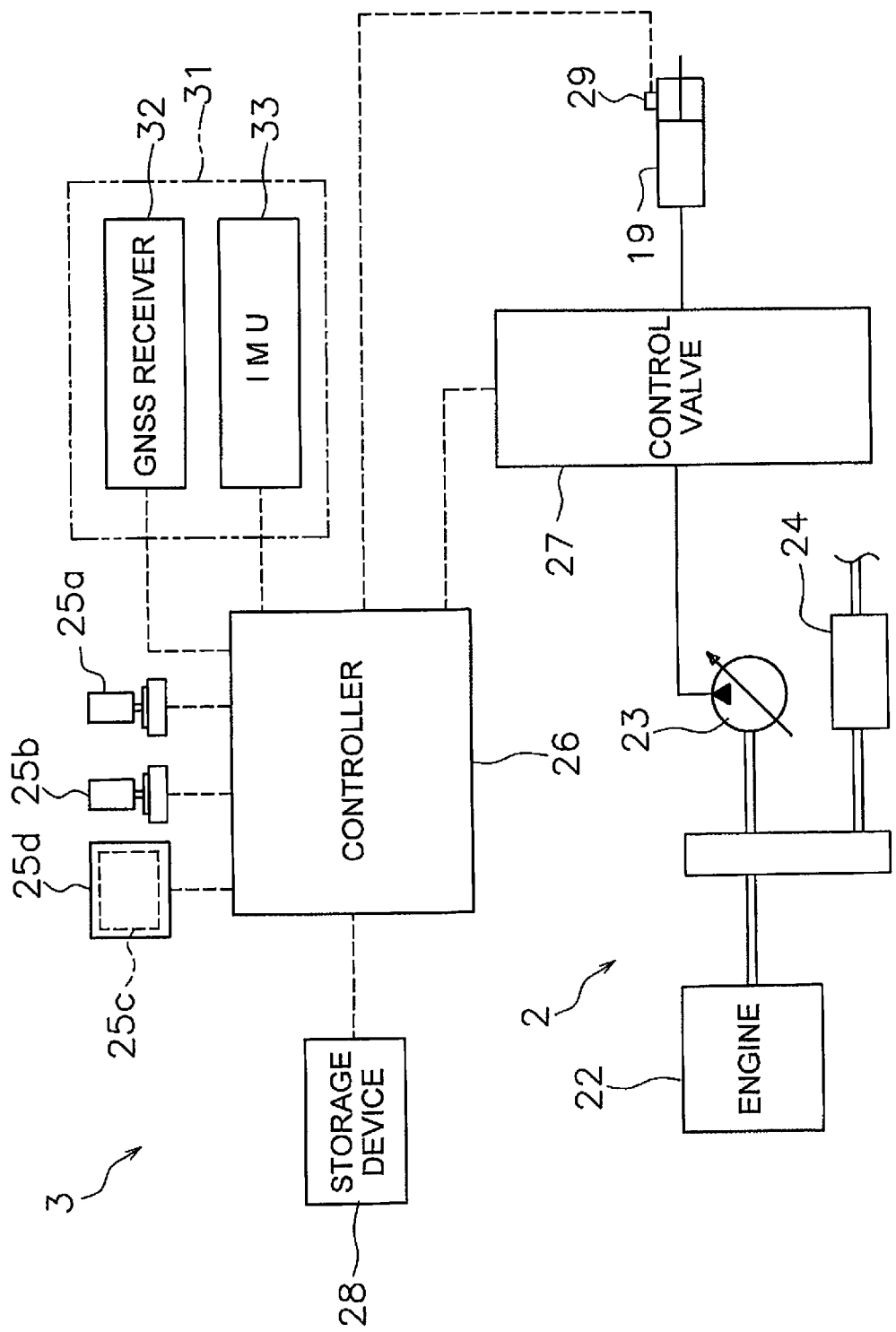
FIG. 2 is a block diagram showing a configuration of a drive system and a control system of the work vehicle.

FIG. 2 is a block diagram showing the configuration of the drive system 2 of the work vehicle 1 and the control system 3. As illustrated in FIG. 2, the drive system 2 includes an engine 22, a hydraulic pump 23, and a power transmission 24.

The hydraulic pump 23 is driven by the engine 22 and discharges hydraulic fluid. The hydraulic fluid discharged from the hydraulic pump 23 is supplied to the lift cylinder 19. Although one hydraulic pump 23 is illustrated in FIG. 2, a plurality of hydraulic pumps may be provided.

The power transmission 24 transmits the driving force of the engine 22 to the traveling device 12. The power transmission 24 may be, for example, HST (Hydro Static Transmission). Alternatively, the power transmission 24 may be, for example, a torque converter or a transmission having a plurality of transmission gears.

The control system 3 includes a first operating device 25a and a second operating device 25b. The first operating device 25a and the second operating device 25b are disposed in the cab 14. The first operating device 25a is a device for operating the traveling device 12. The first operating device 25a receives an operation by an operator for driving the traveling device 12, and outputs an operation signal according to the operation.

The second operating device 25b is a device for operating the work implement 13. The second operating device 25b receives an operation by the operator for driving the work implement 13, and outputs an operation signal according to the operation. The first operating device 25a and the second operating device 25b include, for example, an operating lever, a pedal, a switch, and the like.

The first operating device 25a is operable to a forward position, a reverse position, and a neutral position. An operation signal indicating the position of the first operating device 25a is output to the controller 26. The controller 26 controls the traveling device 12 or the power transmission 24 so that the work vehicle 1 moves forward when the operation position of the first operating device 25a is the forward position. When the operation position of the first operating device 25a is the reverse position, the controller 26 controls the traveling device 12 or the power transmission 24 so that the work vehicle 1 moves backward.

The second operating device 25b is operable to a raising position, a lowering position, and a neutral position. An operation signal indicating the position of the second operating device 25b is output to the controller 26. The controller 26 controls the lift cylinder 19 so that the blade 18 rises when the operation position of the second operating device 25b is the raising position. When the operation position of the second operating device 25b is the lowering position, the controller 26 controls the lift cylinder 19 so that the blade 18 is lowered.

The control system 3 includes an input device 25c and a display 25d. The input device 25c and the display 25d are, for example, a touch screen type display input device. The display 25d is, for example, an LCD or an OLED. However, the display 25d may be another type of display. The input device 25c and the display 25d may be separate devices. For example, the input device 25c may be another input device such as a switch. The input device 25c may be a pointing device such as a mouse or a trackball. The input device 25c outputs an operation signal indicating an operation by the operator to the controller 26.

The control system 3 includes a controller 26, a storage device 28, and a control valve 27. The controller 26 is programmed to control the work vehicle 1 based on the acquired data. The controller 26 includes, for example, a processor such as a CPU. The controller 26 acquires operation signals from the operating devices 25a and 25b. The controller 26 controls the control valve 27 based on the operation signal. The controller 26 acquires an operation signal from the input device 25c. The controller 26 outputs a signal to display a predetermined screen on the display 25d. The controller 26 is not limited to one unit, but may be divided into a plurality of controllers.

The control valve 27 is a proportional control valve, and is controlled by a command signal from the controller 26. The control valve 27 is disposed between a hydraulic actuator such as the lift cylinder 19 and the hydraulic pump 23. The control valve 27 controls the flow rate of hydraulic fluid supplied from the hydraulic pump 23 to the lift cylinder 19. The controller 26 generates a command signal to the control valve 27 so that the blade 18 operates in response to the operation of the second operating device 25b. Thus, the lift cylinder 19 is controlled in accordance with the amount of operation of the second operating device 25b. The control valve 27 may be a pressure proportional control valve. Alternatively, the control valve 27 may be an electromagnetic proportional control valve.

Figure 3:
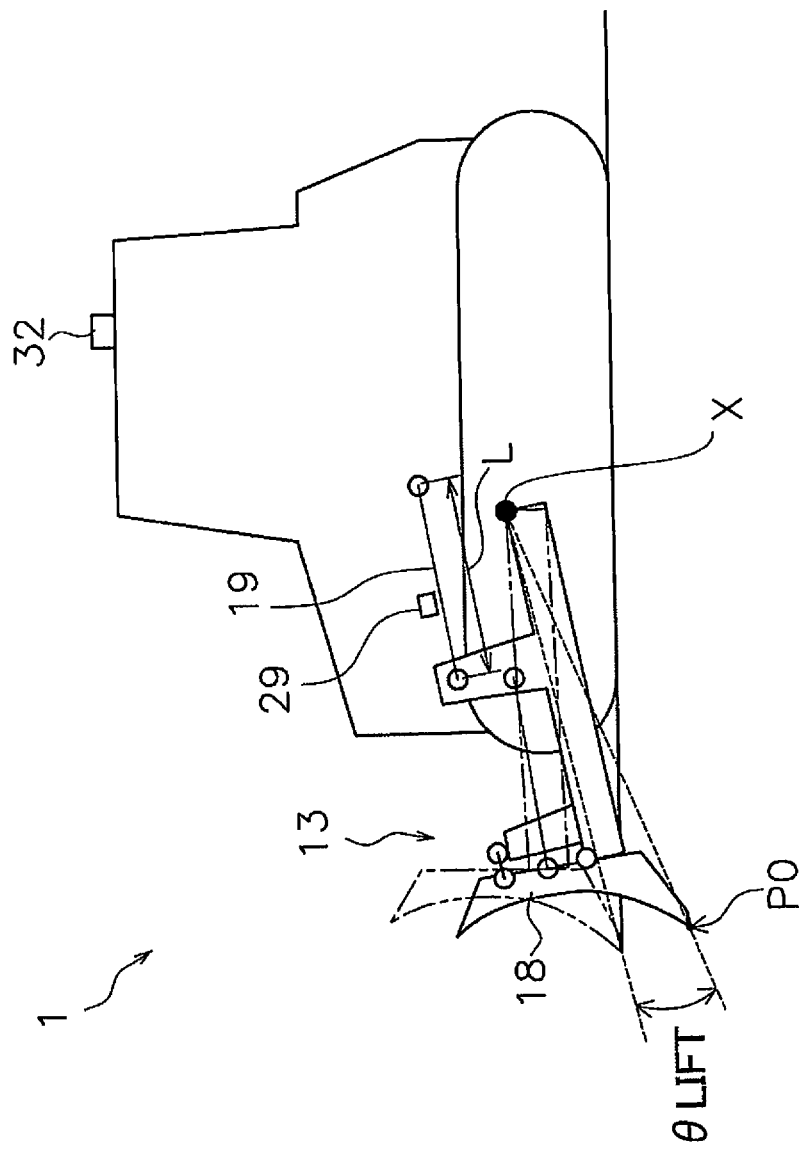
FIG. 3 is a schematic view showing a configuration of the work vehicle.

The control system 3 includes a work implement sensor 29. The work implement sensor 29 detects the position of the work implement, and outputs a work implement position signal indicating the position of the work implement. In detail, the work implement sensor 29 detects the stroke length of the lift cylinder 19 (hereinafter referred to as "lift cylinder length L"). As illustrated in FIG. 3, the controller 26 calculates the lift angle θlift of the blade 18 based on the lift cylinder length L. FIG. 3 is a schematic view showing the configuration of the work vehicle 1.

In FIG. 3, the origin position of the work implement 13 is indicated by a two-dot chain line. The origin position of the work implement 13 is the position of the blade 18 in a state where the blade tip of the blade 18 is in contact with the ground on the horizontal ground. The lift angle θlift is an angle from the origin position of the work implement 13.

As illustrated in FIG. 2, the control system 3 includes a position sensor 31. The position sensor 31 measures the position of the work vehicle 1. The position sensor 31 includes a Global Navigation Satellite System (GNSS) receiver 32 and an IMU 33. The GNSS receiver 32 is, for example, a receiver for GPS (Global Positioning System). The antenna of the GNSS receiver 32 is arranged on the cab 14. The GNSS receiver 32 receives a positioning signal from a satellite, calculates the position of the antenna based on the positioning signal, and generates vehicle position data. The controller 26 acquires vehicle position data from the GNSS receiver 32. The controller 26 obtains the traveling direction of the work vehicle 1 and the vehicle speed from the vehicle position data.

The IMU 33 is an inertial measurement unit. The IMU 33 acquires vehicle body inclination angle data. The vehicle body inclination angle data includes an angle (pitch angle) to the horizontal in the longitudinal direction of the vehicle and an angle (roll angle) to the horizontal in the lateral direction of the vehicle. The controller 26 acquires vehicle body inclination angle data from the IMU 33.

The controller 26 calculates the blade tip position P0 from the lift cylinder length L, the vehicle position data, and the vehicle inclination angle data. As illustrated in FIG. 3, the controller 26 calculates global coordinates of the GNSS receiver 32 based on the vehicle position data. The controller 26 calculates the lift angle θlift based on the lift cylinder length L. The controller 26 calculates local coordinates of the blade tip position P0 with respect to the GNSS receiver 32, based on the lift angle θlift and the vehicle body dimension data. The body dimension data is stored in the storage device 28 and indicates the position of the work implement 13 with respect to the GNSS receiver 32. The controller 26 calculates global coordinates of the blade tip position P0 based on global coordinates of the GNSS receiver 32, local coordinates of the blade tip position P0, and vehicle body inclination angle data. The controller 26 acquires global coordinates of the blade tip position P0 as blade tip position data.

The storage device 28 includes, for example, a memory and an auxiliary storage device. The storage device 28 may be, for example, a RAM or a ROM. The storage device 28 may be a semiconductor memory or a hard disk. The storage device 28 is an example of a non-transitory computer readable recording medium. The storage device 28 stores computer instructions that can be executed by the processor and control the work vehicle 1.

The storage device 28 stores design topography data and work site topography data. The design topography data indicates the final design topography. The final design topography is the final target shape of the work site surface. The design topography data is, for example, a construction drawing in a three-dimensional data format. The work site topography data indicates the actual topography of the work site. The work site topography data is, for example, a survey drawing of the actual topography in a three-dimensional data format. The work site topography data can be obtained, for example, by aviation laser survey.

The controller 26 acquires actual topography data. The actual topography data indicates the actual topography of the work site. The actual topography of the work site is the actual topography of the area along the traveling direction of the work vehicle 1. The actual topography data is obtained by calculation in the controller 26 from work site topography data and the position and the traveling direction of the work vehicle 1 obtained from the position sensor 31 described above.

The controller 26 automatically controls the work implement 13 based on the actual topography data, the design topography data, and the blade tip position data. The automatic control of the work implement 13 may be semi-automatic control performed together with the manual operation by the operator. Alternatively, the automatic control of the work implement 13 may be a fully automatic control performed without manual operation by the operator.

Figure 4:
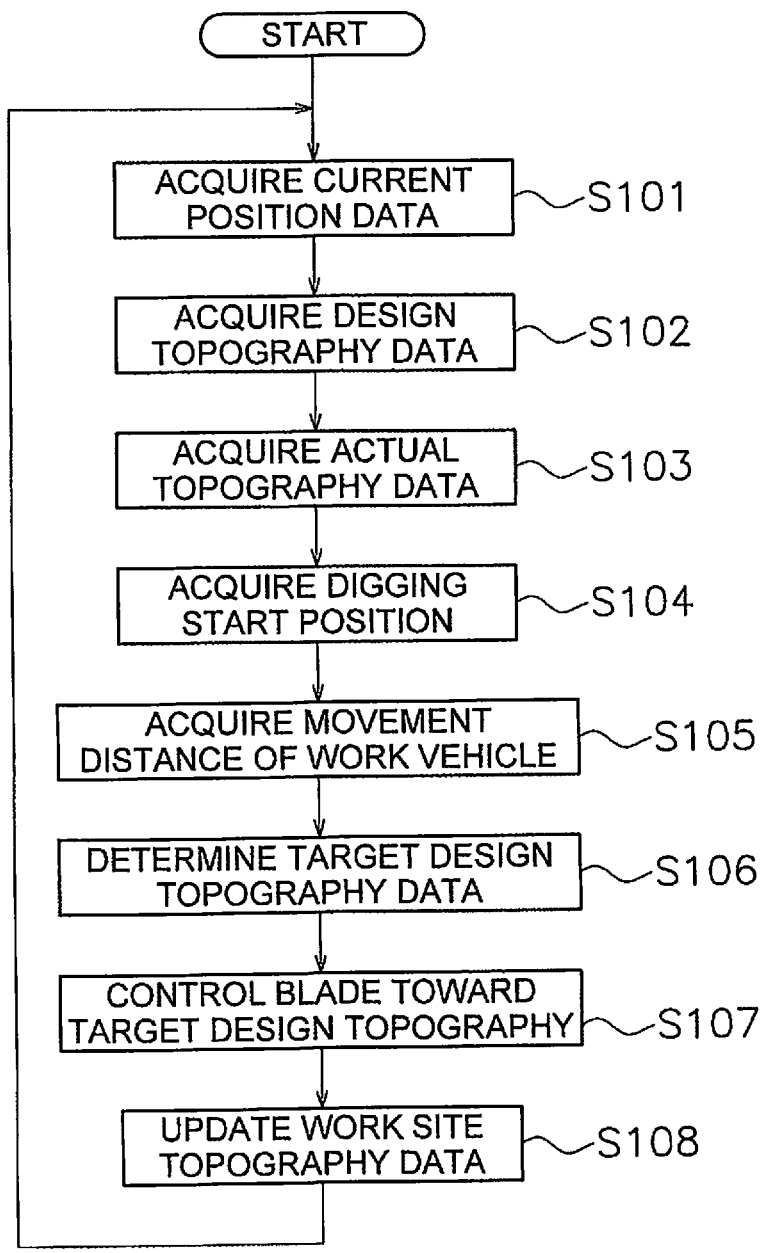
FIG. 4 is a flowchart showing a process of automatic control of the work implement.

Hereinafter, the automatic control of the work implement 13 in digging performed by the controller 26 will be described. FIG. 4 is a flowchart showing the process of automatic control of the work implement 13 in the digging operation.

As illustrated in FIG. 4, in step S101, the controller 26 acquires current position data. Here, the controller 26 obtains the current blade tip position P0 of the blade 18 as described above.

Figure 5:
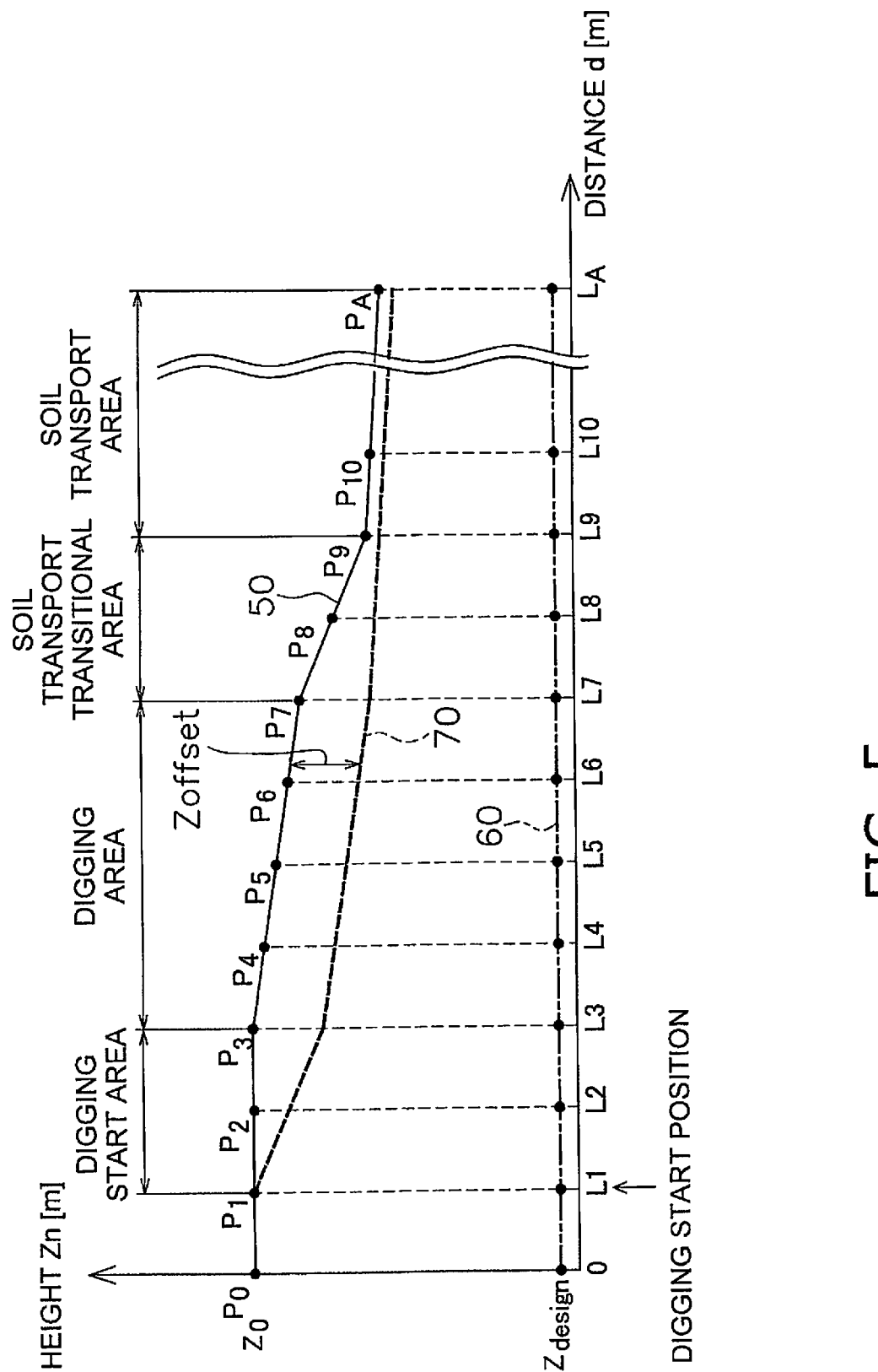
FIG. 5 is a diagram showing an example of a final design topography, an actual topography, and a target design topography.

In step S102, the controller 26 acquires design topography data. As illustrated in FIG. 5, the design topography data indicates the heights of the final design topography 60 at a plurality of reference points Pn (n=0, 1, 2, 3, . . . , A) in the traveling direction of the work vehicle 1 Including Zdesign. The plurality of reference points Pn indicate a plurality of points at predetermined intervals along the traveling direction of the work vehicle 1. The plurality of reference points Pn are on the traveling path of the blade 18. In FIG. 5, the final design topography 60 has a flat shape parallel to the horizontal direction, but may have a different shape.

In step S103, the controller 26 acquires actual topography data. The controller 26 obtains actual topography data by calculation from the work site topography data obtained from the storage device 28 and a position data and a traveling direction data of the vehicle body obtained from the position sensor 31.

The actual topography data is information indicating the topography located in the traveling direction of the work vehicle 1. FIG. 5 shows a cross section of the actual topography 50. In FIG. 5, the vertical axis indicates the height of the topography, and the horizontal axis indicates the distance from the current position in the traveling direction of the work vehicle 1.

More specifically, the actual topography data includes the height $Zn$ of the actual topography 50 at a plurality of reference points $Pn$ from the present position to a predetermined topography recognition distance LA in the traveling direction of the work vehicle 1. In the present embodiment, the current position is a position determined based on the current blade tip position P0 of the work vehicle 1. However, the current position may be determined based on the current position of the other part of the work vehicle 1. The plurality of reference points are arranged at predetermined intervals, for example, every 1 m.

In step S104, the controller 26 acquires a digging start position. For example, the controller 26 acquires a position at which the blade tip position P0 first falls below the height ZO of the actual topography 50 as the digging start position. Thus, the position at which the blade tip of the blade 18 is lowered to start digging the actual topography 50 is obtained as the digging start position. However, the controller 26 may obtain the digging start position by another method. For example, the controller 26 may acquire the digging start position based on the operation of the second operating device 25b. Alternatively, the controller 26 may obtain the digging start position by calculating the optimal digging start position from the actual topography data.

In step S105, the controller 26 acquires the movement distance of the work vehicle 1. The controller 26 acquires the distance traveled from the digging start position to the current position in the travelling path of the blade 18 as the movement distance. The movement distance of the work vehicle 1 may be the movement distance of the vehicle body 11. Alternatively, the movement distance of the work vehicle 1 may be the movement distance of the blade tip of the blade 18.

In step S106, the controller 26 determines target design topography data. The target design topography data shows the target design topography 70 depicted by dashed lines in FIG. 5. The target design topography 70 shows the desired trajectory of the blade tip of the blade 18 in operation. The target design topography 70 shows the desired shape as a result of the digging operation.

As illustrated in FIG. 5, the controller 26 determines a target design topography 70 displaced downward from the actual topography 50 by a target displacement Z_offset. The target displacement Z_offset is a target displacement in the vertical direction at each reference point $Pn$. In the present embodiment, the target displacement Z_offset is a target depth at each reference point $Pn$, and indicates the target position of the blade 18 below the actual topography 50. The target position of the blade 18 means the blade tip position of the blade 18. In other words, the target displacement Z_offset indicates the amount of soil per unit movement distance dug by the blade 18. Therefore, the target design topography data indicates the relationship between the plurality of reference points $Pn$ and the plurality of target soil volumes. The target displacement Z_offset is an example of a target parameter related to the target digging amount of the blade 18.

The controller 26 determines the target design topography 70 so as not to pass over the final design topography 60 downward. Therefore, the controller 26 determines a target design topography 70 located above the final design topography 60 and below the actual topography 50 during the digging operation.

Specifically, the controller 26 determines the height Z of the target design topography 70 according to the following equation (1).

$$Z = Zn - Z\_\text{offset} \quad (1)$$

Figure 6:
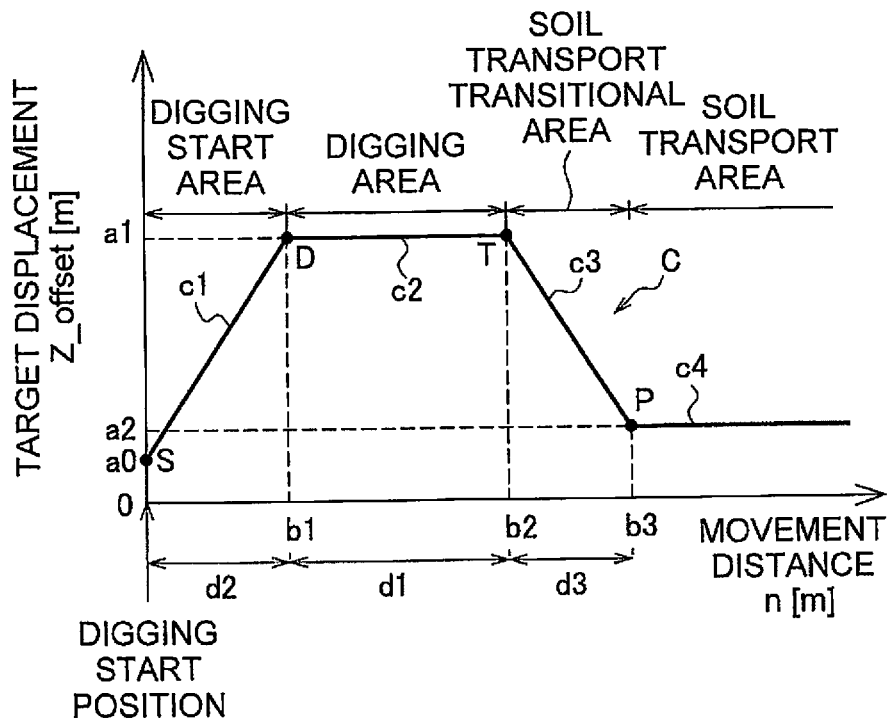
FIG. 6 is a diagram showing an example of target parameter data.

The target displacement Z_offset is determined by referring to the target parameter data C. The target parameter data C is stored in the storage device 28. FIG. 6 is a diagram showing an example of the target parameter data C. The target parameter data C defines the relationship between the movement distance n of the work vehicle 1 and the target parameter. In the present embodiment, the target parameter data C defines the relationship between the movement distance n of the work vehicle 1 and the target displacement Z_offset.

In detail, the target parameter data C indicates the digging depth (target displacement) Z_offset of the blade 18 in the vertical downward direction from the ground surface as a dependent variable of the horizontal movement distance n of the work vehicle 1. The horizontal movement distance n of the work vehicle 1 is substantially the same value as the horizontal movement distance of the blade 18. The controller 26 determines the target displacement Z_offset from the movement distance n of the work vehicle 1 with reference to the target parameter data C illustrated in FIG. 6.

As illustrated in FIG. 6, the target parameter data C includes start time data c1, digging time data c2, transitional time data c3, and soil unloading time data c4. The start time data c1 defines the relationship between the movement distance n and the target displacement Z_offset in the digging start area. The digging start area is a range from the digging start point S to the steady digging start point D. As indicated by the start time data c1, in the digging start area, a target displacement Z_offset that increases as the movement distance n increases is defined.

The digging time data c2 defines the relationship between the movement distance n and the target displacement Z_offset in the digging area. The digging area is an area from the steady digging start point D to the soil transfer start point T. As indicated by the digging time data c2, in the digging area, the target displacement Z_offset is defined to a constant value. The digging time data c2 defines a constant target displacement Z_offset with respect to the movement distance n.

The transitional time data c3 defines the relationship between the movement distance n and the target displacement Z_offset in the soil transport transitional area. The soil transport transitional area is an area from the steady digging end point T to the soil transport start point P. The transitional time data c3 defines a target displacement Z_offset that decreases as the movement distance n increases.

The soil transport time data c4 defines the relationship between the movement distance n and the target displacement Z_offset in the soil transport area. The soil transport area is an area starting from the soil transport start point P. As indicated by the soil transport time data c4, the target displacement Z_offset is defined to a constant value in the soil transport area. The soil transport time data c4 defines a constant target displacement Z_offset with respect to the movement distance n.

In detail, the digging area starts from the first start value b1 and ends at the first end value b2. The soil transport area is started from the second start value b3. The first end value b2 is smaller than the second start value b3. Therefore, the digging area is started when the movement distance n is smaller than the soil transport area. The target displacement Z_offset in the digging area is constant at the first target value a1. The target displacement Z_offset in the soil transport area is constant at the second target value a2. The first target value a1 is larger than the second target value a2. Therefore, in the digging area, a target displacement Z_offset larger than that of the soil transport area is defined.

The target displacement Z_offset at the digging start position is a start value a0. The start value a0 is smaller than the first target value a1. The start target value a0 is smaller than the second target value a2.

Figure 7:
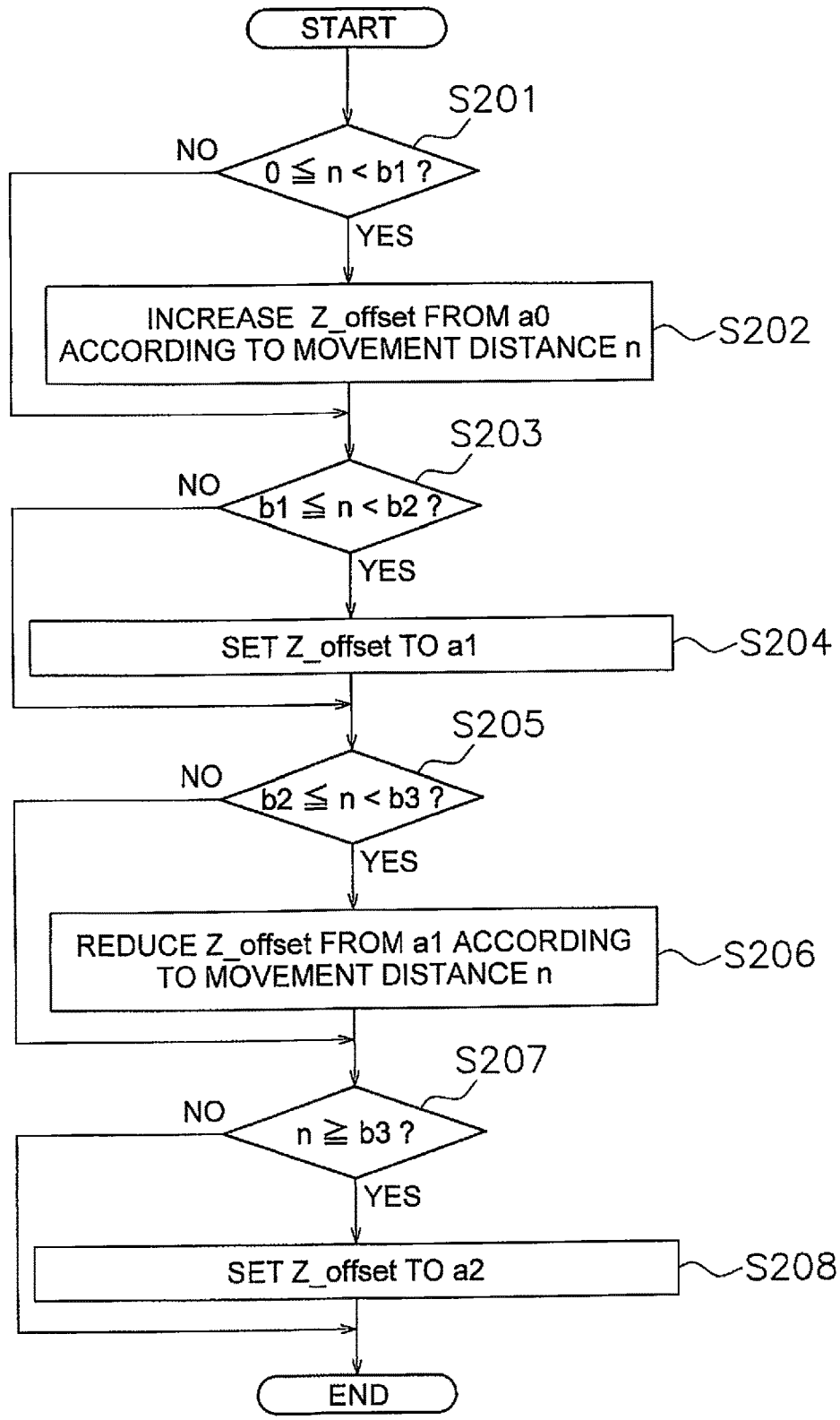
FIG. 7 is a flow chart showing a process for determining a target displacement.

FIG. 7 is a flowchart showing the process of determining the target displacement Z_offset. In order to simplify the explanation, in the decision processing described below, it is assumed that work vehicle 1 travels only forward. The determination process is started when the first operating device 25a moves to the forward position. In step S201, the controller 26 determines whether the movement distance n is 0 or more and less than the first start value b1. When the movement distance n is 0 or more and less than the first start value b1, in step S202, the controller 26 gradually increases the target displacement Z_offset from the start value a0 according to the increase of the movement distance n.

The start value a0 is a fixed value and is stored in the storage device 28. The start value a0 is preferably as small as possible so that the load on the blade 18 does not become excessively large at the start of digging. The first start value b1 is calculated from the inclination c1 in the digging start area illustrated in FIG. 6, the start value a0, and the first target value a1. The inclination c1 is a fixed value and is stored in the storage device 28. The inclination c1 is preferably a value that allows rapid transitional from the digging start to the digging operation and that the load on the blade 18 does not become excessively large.

In step S203, the controller 26 determines whether the moving distance n is equal to or greater than the first start value b1 and less than the first end value b2. When the movement distance n is equal to or more than the first start value b1 and less than the first end value b2, in step S204, the controller 26 sets the target displacement Z_offset to the first target value a1. The first target value a1 is a fixed value and is stored in the storage device 28. The first target value a1 is preferably such a value that digging can be efficiently performed and the load on the blade 18 does not become excessively large.

In step S205, the controller 26 determines whether the movement distance n is equal to or greater than the first end value b2 and less than the second start value b3. When the movement distance n is equal to or greater than the first end value b2 and less than the second start value b3, in step S206, the controller 26 gradually reduces the target displacement Z_offset from the first target value a1 according to the increase of the movement distance n.

The first end value b2 is a movement distance when the current amount of soil held by the blade 18 exceeds a predetermined threshold. Therefore, the controller 26 reduces the target displacement Z_offset from the first target value a1 when the current amount of soil held by the blade 18 exceeds a predetermined threshold. The predetermined threshold is determined based on, for example, the maximum capacity of the blade 18. For example, the load on the blade 18 may be measured and the current amount of soil held by the blade 18 may be determined from the load by calculating. Alternatively, an image of the blade 18 may be acquired by a camera, and by analyzing the image, the current amount of soil held by the blade 18 may be calculated.

At the start of work, a predetermined initial value is set as the first end value b2. After the start of the work, the movement distance when the amount of soil held by the blade 18 exceeds a predetermined threshold is stored as an update value, and the first end value b2 is updated based on the stored update value.

In step S207, the controller 26 determines whether the moving distance n is equal to or greater than a second start value b3. When the movement distance n is equal to or larger than the second start value b3, the controller 26 sets the target displacement Z_offset to the second target value a2 in step S208.

The second target value a2 is a fixed value and is stored in the storage device 28. The second target value a2 is preferably set to a value suitable for soil transport work. The second start value b3 is obtained by calculation from the inclination c2 in the soil transport transitional area illustrated in FIG. 6, the first target value a1, and the second target value a2. The inclination c2 is a fixed value and is stored in the storage device 28. The inclination c2 is preferably a value such that the operation can be quickly transferred from the digging operation to the soil transport operation and the load on the blade 18 does not become excessively large.

The start value a0, the first target value a1, and the second target value a2 may be changed according to the situation of the work vehicle 1 or the like. The first start value b1, the first end value b2, and the second start value b3 may be stored in the storage device 28 as fixed values.

As described above, the height Z of the target design topography 70 is determined by determining the target displacement Z_offset.

In step S107 illustrated in FIG. 4, the controller 26 controls the blade 18 toward the target design topography 70. Here, the controller 26 generates a command signal to the work implement 13 so that the blade tip position of the blade 18 moves toward the target design topography 70 generated in step S106. The generated command signal is input to the control valve 27. Thereby, the blade tip position P0 of the work implement 13 moves along the target design topography 70.

In the above-described digging area, the target displacement Z_offset between the actual topography 50 and the target design topography 70 is large compared to the other areas. Thereby, the digging work of the actual topography 50 is performed in the digging area. In the soil transport area, the target displacement Z_offset between the actual topography 50 and the target design topography 70 is smaller compared to other areas. Thereby, in the soil transport area, digging of the ground is avoided, and the soil held by the blade 18 is transported.

In step S108, the controller 26 updates the work site topography data. The controller 26 updates the work site topography data with the position data indicating the latest trajectory of the blade tip position P0. Alternatively, the controller 26 may calculate the position of the bottom surface of the crawler belt 16 from the vehicle body position data and the vehicle body dimension data, and update the work site topography data with the position data indicating the trajectory of the bottom surface of the crawler belt 16. In this case, updating of the work site topography data can be performed immediately.

Alternatively, the work site topography data may be generated from survey data measured by a survey instrument external to the work vehicle 1. For example, aviation laser survey may be used as the external surveying instrument. Alternatively, the actual topography 50 may be photographed by a camera, and the work site topography data may be generated from image data obtained by the camera. For example, aerial surveying with a UAV (Unmanned Aerial Vehicle) may be used. In the case of an external surveying instrument or camera, updating of the work site topography data may be performed at predetermined intervals or at any time.

The above process is performed when the work vehicle 1 is moving forward. For example, when the first operating device 25a is in the forward position, the above process is performed. However, when the work vehicle 1 moves backward a predetermined distance or more, the digging start position, the movement distance n, and the amount of soil held by the blade 18 are initialized.

Then, when the work vehicle 1 moves forward again, the above process is executed. The controller 26 updates the actual topography 50 based on the updated work site topography data, and newly determines the target design topography 70 based on the updated actual topography 50. The controller 26 then controls the blade 18 along the newly determined target design topography 70. By repeating such processing, digging is performed such that the actual topography 50 approaches the final design topography 60.

As described above, the period from when the work vehicle 1 moves forward and starts digging until the work vehicle 1 switches to reverse is referred to as one work path. The work vehicle 1 moves backward to return to a position beyond the original digging start position, and the work vehicle 1 moves forward again and start digging, whereby the next work path is executed.

Figure 8:
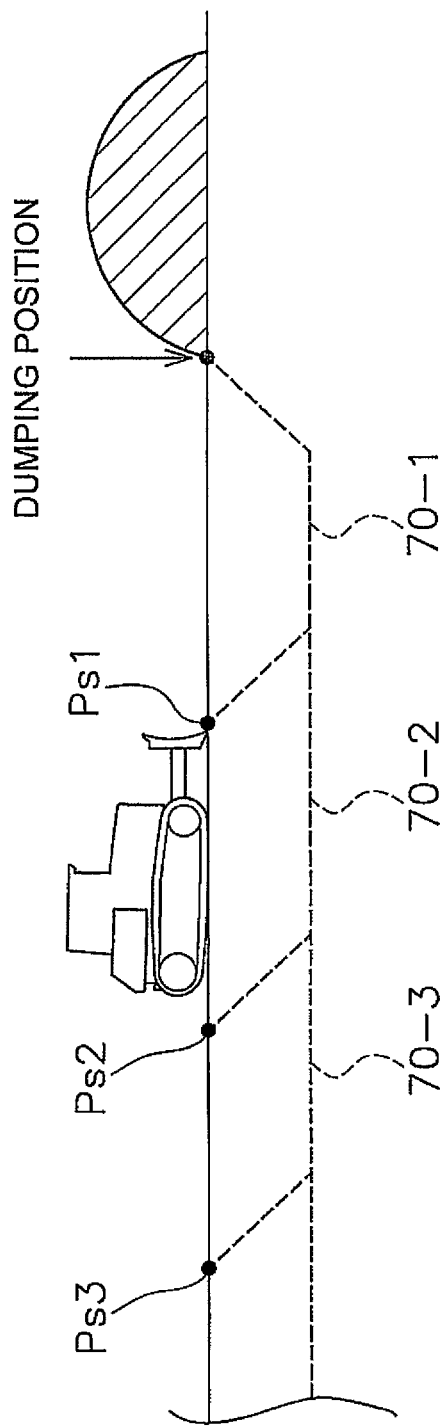
FIG. 8 is a diagram showing an example of an digging start position in each work path.

For example, as illustrated in FIG. 8, in the first work path, the work vehicle 1 starts digging at a digging start position Ps1 separated rearward from the dumping position by a predetermined distance. The controller 26 controls the work implement 13 in accordance with the target design topography 70-1 of the first work path. When the first work path is finished, the work vehicle 1 moves backward and returns to a position beyond the original digging start position Ps1.

Next, in the second work path, the work vehicle 1 starts digging at an operation start position Ps2 separated rearward from the original digging start position Ps1 by a predetermined distance. The controller 26 controls the work implement 13 in accordance with the target design topography 70-2 of the second work path. When the second work path ends, the work vehicle 1 moves backward and returns to a position beyond the original digging start position Ps2.

Next, in the third work path, the work vehicle 1 starts digging at an operation start position Ps3 which is separated rearward from the original digging start position P2 by a predetermined distance. The controller 26 controls the work implement 13 according to the target design topography 70-3 of the third work path. By repeating such work, it is possible to excavate the surface layer of the travel path of the work vehicle 1.

Figure 9:
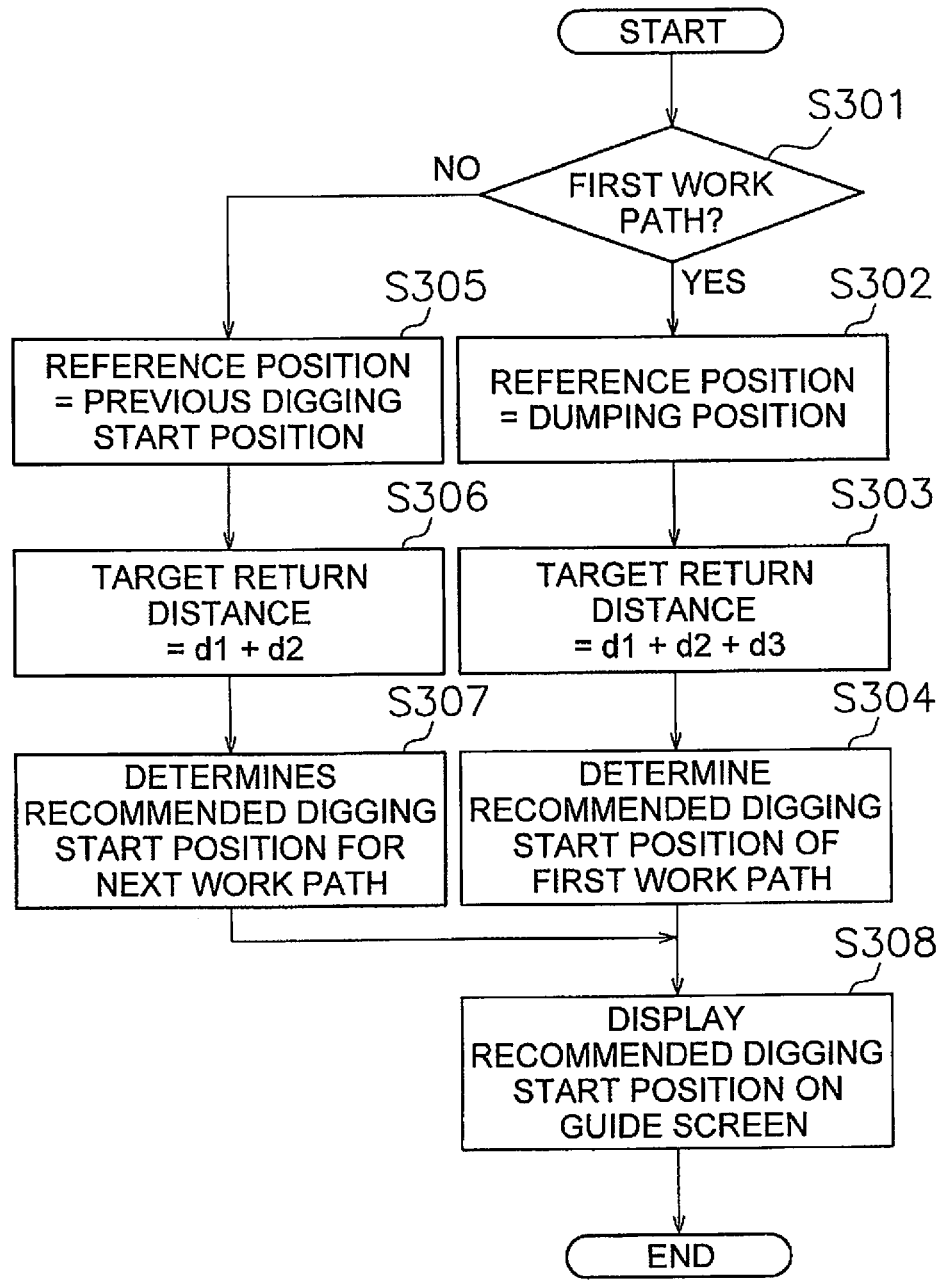
FIG. 9 is a flowchart showing a process for determining a recommended digging start position.

In the control system 3 of the work vehicle 1 according to the present embodiment, the controller 26 determines the recommended digging start position in the next work path in the above-described work, and displays it on the guide screen on the display 25d. The process of determining the recommended digging start position will be described below. FIG. 9 is a flow chart showing processing for determining a recommended digging start position.

As illustrated in FIG. 9, in step S301, the controller 26 determines whether the current work path is the first work path. For example, the controller 26 may determine that the current work path is the first work path when executing work for the first time after the engine of the work vehicle 1 is started. Alternatively, the controller 26 may determine, as the first work path, the work path to be performed first after the operator sets a certain position in the work site as the dumping position by the input device 25c. If the controller 26 determines that the current work path is the first work path, the process proceeds to step S302.

In step S302, the controller 26 determines the dumping position as a predetermined reference position. For example, the controller 26 acquires, as the dumping position, the position in the work site set by an operator with the input device 25c. Alternatively, the controller 26 may determine a predetermined position preset in the actual topography data as the dumping position.

In step S303, the controller 26 determines the sum of the distance d1 of the digging area, the distance d2 of the digging start area, and the distance d3 of the soil transport transitional area as the target return distance. As illustrated in FIG. 6, the controller 26 acquires, from the target parameter data C, the distance d1 of the digging area, the distance d2 of the digging start area, and the distance d3 of the soil transport transitional area.

The distance d1 of the digging area is the movement distance of the work vehicle 1 in the digging area. In other words, the distance d1 of the digging area is the distance from the start position to the end position of the digging area. The distance d2 of the digging start area is the movement distance of the work vehicle 1 in the digging start area. In other words, the distance d2 of the digging start area is the distance from the start position to the end position of the digging start area. The distance d3 of the soil transport transitional area is the movement distance of the work vehicle 1 in the soil transport transitional area. In other words, the distance d3 of the soil transport transitional area is the distance from the start position to the end position of the soil transport transitional area.

Figure 10:
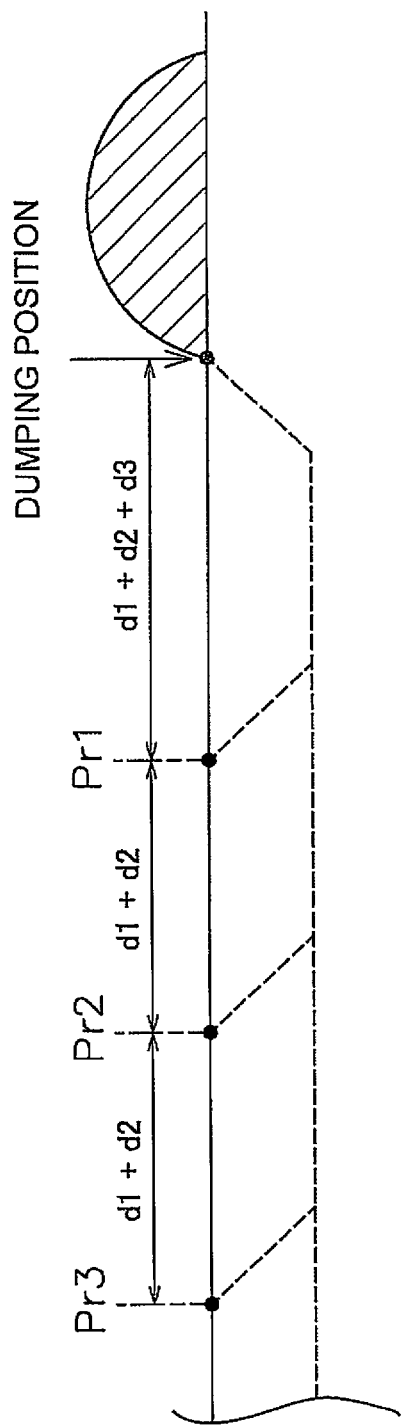
FIG. 10 is a diagram showing an example of a recommended digging start position.

In step S304, the controller 26 determines the recommended digging start position of the first work path. Here, as illustrated in FIG. 10, the controller 26 determines a position returned backward from the dumping position by the target return distance d1+d2+d3 as the recommended digging start position Pr1 of the first work path.

In step S301, when the controller 26 determines that the current work path is not the first work path, the process proceeds to step S305. That is, when the current work path is a work path after the second work path, the process proceeds to step S305. In step S305, the controller 26 determines the previous digging start position as a predetermined reference position. The controller 26 determines the previous digging start position acquired in the same manner as step S104 in FIG. 4 as the predetermined reference position.

In step S306, the controller 26 determines the sum of the distance d1 of the digging area and the distance d2 of the digging start area as the target return distance.

In step S307, the controller 26 determines a recommended digging start position for the next work path. Here, the controller 26 determines a position returned backward from the previous digging start position by the target return distance d1+d2 as the recommended digging start position of the next work path. For example, as illustrated in FIG. 10, at the start of the second work path, the controller 26 determines a position returned backward from the digging start position (for example, the recommended digging start position Pr1) of the first work path by the target return distance d1+d2 as the recommended digging start position Pr2 of the second work path. In addition, at the start of the third work path, the controller 26 determines a position returned backward from the digging start position (for example, the recommended digging start position Pr2) of the second work path by the target return distance d1+d2 as a start recommended position Pr3 of the third work path.

In step S308, the controller 26 displays the recommended digging start position on the guide screen 80 on the display 25d. FIG. 9 is a view showing an example of the guide screen 80. As illustrated in FIG. 9, the guide screen 80 includes an icon 81 indicating the current position of the work vehicle 1, the actual topography 50 around the work vehicle 1, and an icon 82 indicating the recommended digging start position. The controller 26 outputs a display signal indicating the guide screen 80 to the display 25d.

Figure 11:
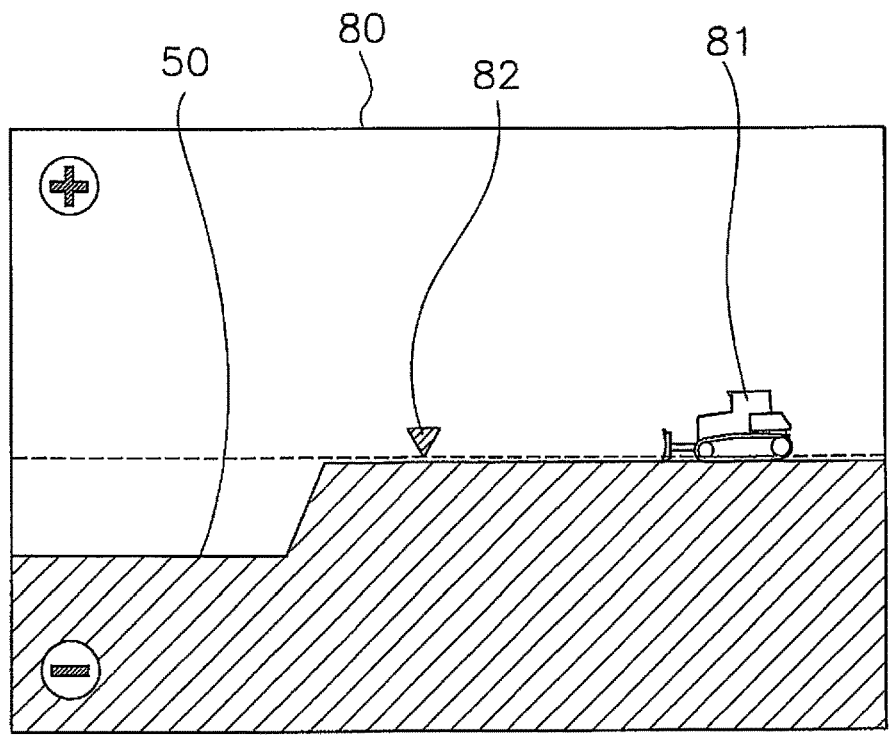
FIG. 11 is a diagram showing an example of a guide screen.
Figure 12:
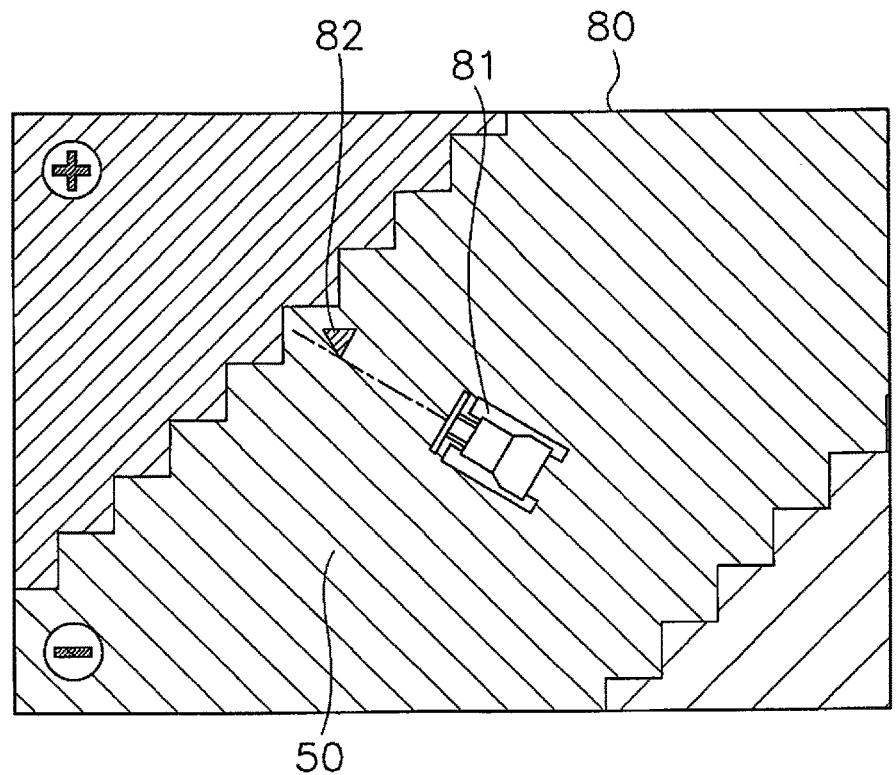
FIG. 12 is a view showing another example of the guide screen.

Although the guide screen 80 is a side view in FIG. 11, as illustrated in FIG. 12, the guide screen 80 may be a top view. Alternatively, the guide screen 80 may be switchable between a side view and a top view. In the top guide screen 80, the actual topography 50 may be illustrated in different colors depending on its height. In FIG. 11, different colors are expressed depending on the type of hatching.

In the control system 3 of the work vehicle 1 according to the present embodiment described above, the controller 26 determines the target return distance from the distance d1 of the digging area, and determines a position returned from the predetermined reference position by the target return distance as the recommended digging start position. Since the distance d1 of the digging area is a distance defined in the target parameter data as an area to be dug, an appropriate position for the next digging can be determined as the recommended digging start position. Further, the controller 26 determines a position returned from the predetermined reference position by the target return distance as the next recommended digging start position. Therefore, the computational load on the controller 26 can be reduced.

At the start of the first work path, the controller 26 determines the sum of the distance d1 of the digging area, the distance d2 of the digging start area and the distance d3 of the soil transport transitional area as the target return distance, and determines a position returned from the dumping position by the target return distance d1+d2+d3 as a recommended digging start position Pr1 of the first work path. Therefore, not only the digging area but also the digging start area and the soil transport transitional area can be considered to determine an appropriate recommended digging start position.

At the start of the work path after the second work path, the controller 26 determines the sum of the distance d1 of the digging area and the distance d2 of the digging start area as the target return distance, and determines a position returned from the previous digging start position by the target return distance d1+d2 as a recommended digging start position for the next work path. Therefore, it is possible to determine an appropriate next recommended digging start position in consideration of the digging start area and the digging area.

Preferred embodiments of the present invention have been explained above. However, the present invention is not limited to the aforementioned preferred embodiments, and a variety of changes can be made without departing from the scope of the present invention.

The work vehicle 1 is not limited to a bulldozer, but may be another vehicle such as a wheel loader or a motor grader.

The work vehicle 1 may be a remotely steerable vehicle. In that case, part of the control system 3 may be arranged outside the work vehicle 1. For example, the controller 26 may be disposed outside the work vehicle 1. The controller 26 may be located in a control center remote from the work site.

Figure 13:
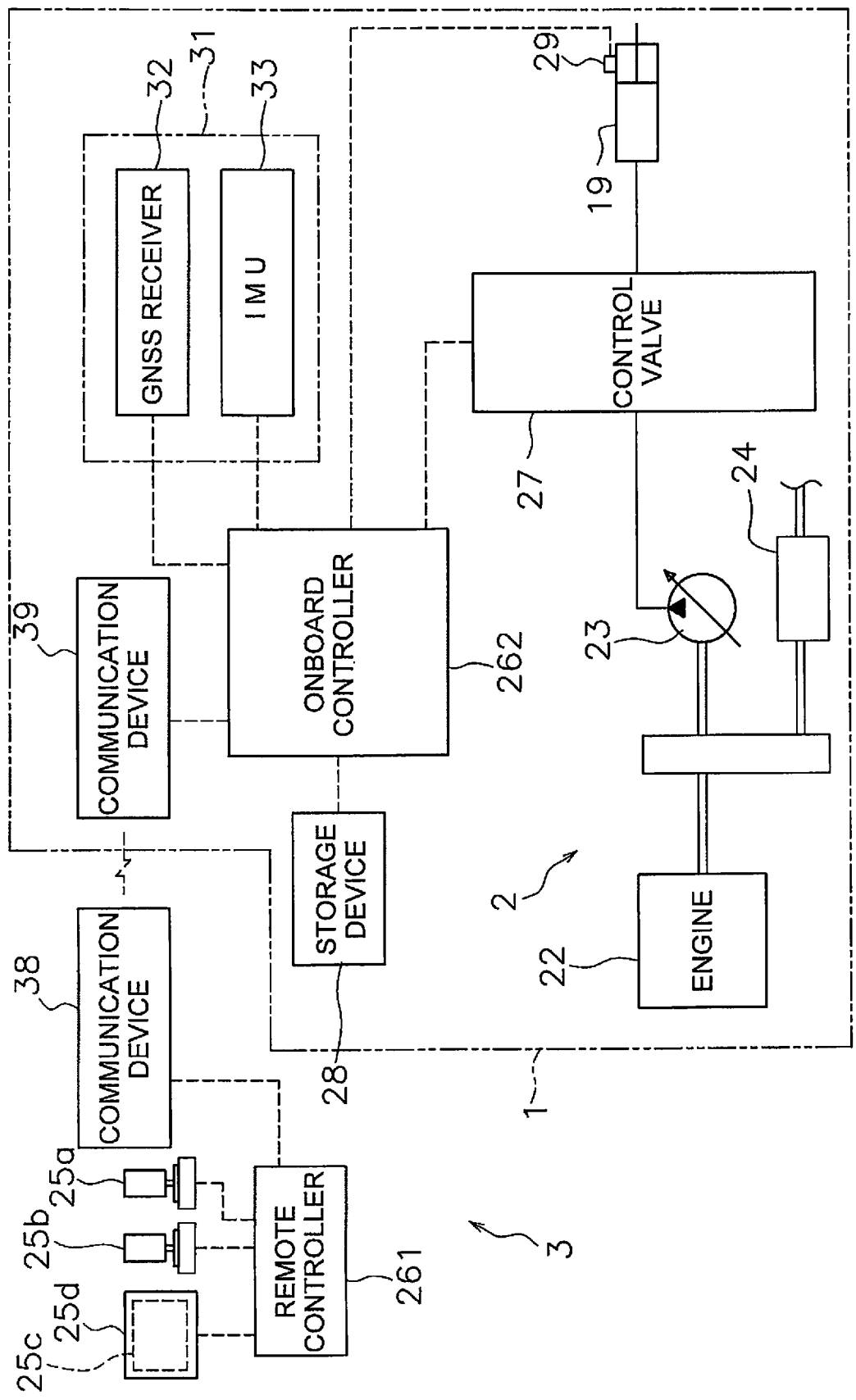
FIG. 13 is a block diagram showing a configuration of a control system according to a first modification.

The controller 26 may have a plurality of controllers 26 separate from one another. For example, as illustrated in FIG. 13, the controller 26 may include a remote controller 261 which is arranged outside the work vehicle 1 and an onboard controller 262 mounted to the work vehicle 1. The remote controller 261 and the onboard controller 262 may be able to communicate wirelessly via the communication devices 38 and 39. Then, part of the functions of the controller 26 described above may be performed by the remote controller 261, and the remaining functions may be performed by the onboard controller 262. For example, the process of determining the target design topography 70 may be performed by the remote controller 261, and the process of outputting a command signal to the work implement 13 may be performed by the onboard controller 262.

The operating devices 25a and 25b, the input device 25c, and the display 25d may be disposed outside the work vehicle 1. In that case, the cab may be omitted from the work vehicle 1. Alternatively, the operating devices 25a and 25b, the input device 25c, and the display 25d may be omitted from the work vehicle 1. The work vehicle 1 may be operated only by the automatic control by the controller 26 without the operation by the operating devices 25a and 25b.

Figure 14:
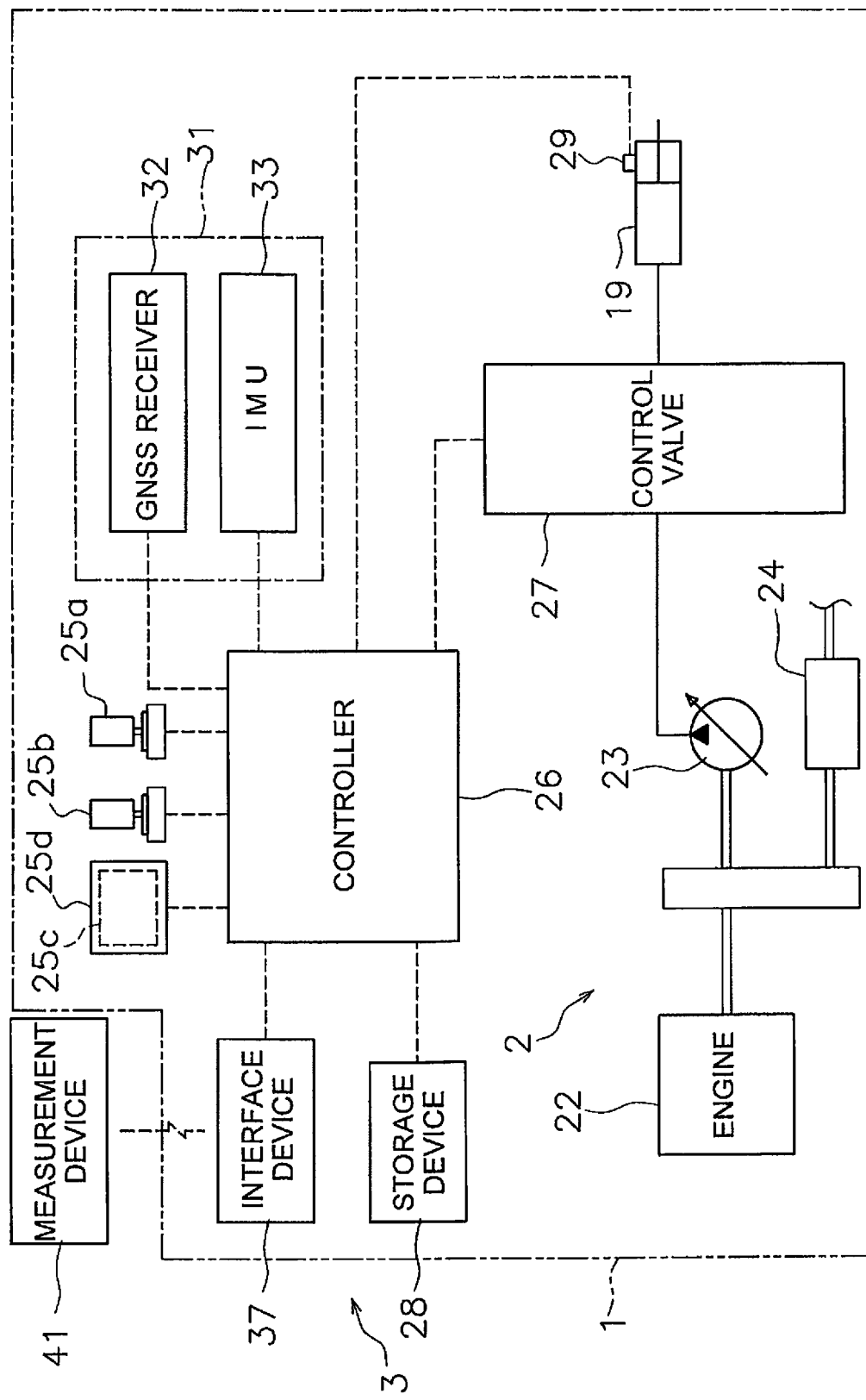
FIG. 14 is a block diagram showing a configuration of a control system according to a second modification.

The actual topography 50 may be acquired by other devices as well as the position sensor 31 described above. For example, as illustrated in FIG. 14, the actual topography 50 may be acquired by the interface device 37 that receives data from an external device. The interface device 37 may wirelessly receive the actual topography data measured by the external measurement device 41. Alternatively, the interface device 37 may be a reading device of a recording medium, and may receive actual topography data measured by the external measurement device 41 via the recording medium.

The target parameter data is not limited to the data illustrated in FIG. 6, and may be changed. The target parameter is a parameter related to the target digging amount of the work implement 13 and may be another parameter without being limited to the target displacement of the above embodiment. For example, FIG. 15 is a diagram showing another example of the target parameter data.

Figure 15:
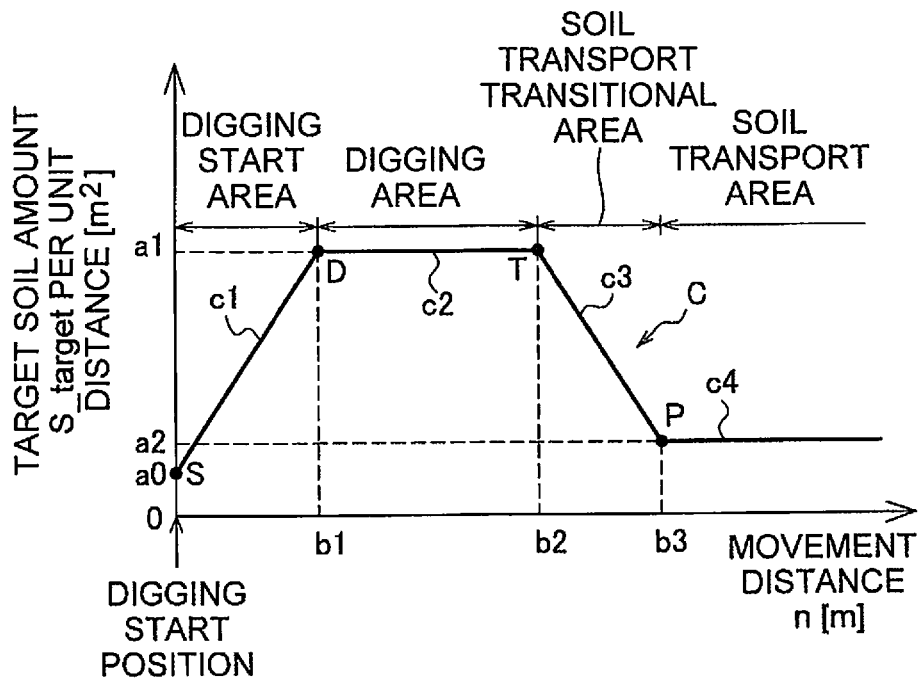
FIG. 15 is a view showing another example of target parameter data.

As illustrated in FIG. 15, the target parameter may be a target soil amount S_target for each point of flat topography. That is, the target parameter may be the target soil amount S_target per unit distance. For example, the controller 26 can calculate the target displacement Z_offset from the target soil amount S_target and the width of the blade 18. Alternatively, the target parameter may be a parameter different from the target soil amount S_target per unit distance. For example, the target parameter may be a parameter indicating the target value of the load to the work implement 13 at each point. The controller 26 can calculate the target displacement Z_offset for each point from the target parameter. In that case, the controller 26 may increase the target displacement Z_offset in response to the increase of the target parameter.

The target displacement Z_offset may be multiplied by a predetermined coefficient. Alternatively, a predetermined constant may be added to or subtracted from the target displacement Z_offset. The predetermined coefficient and the predetermined constant may be changed according to the change of the control mode.

Figure 16:
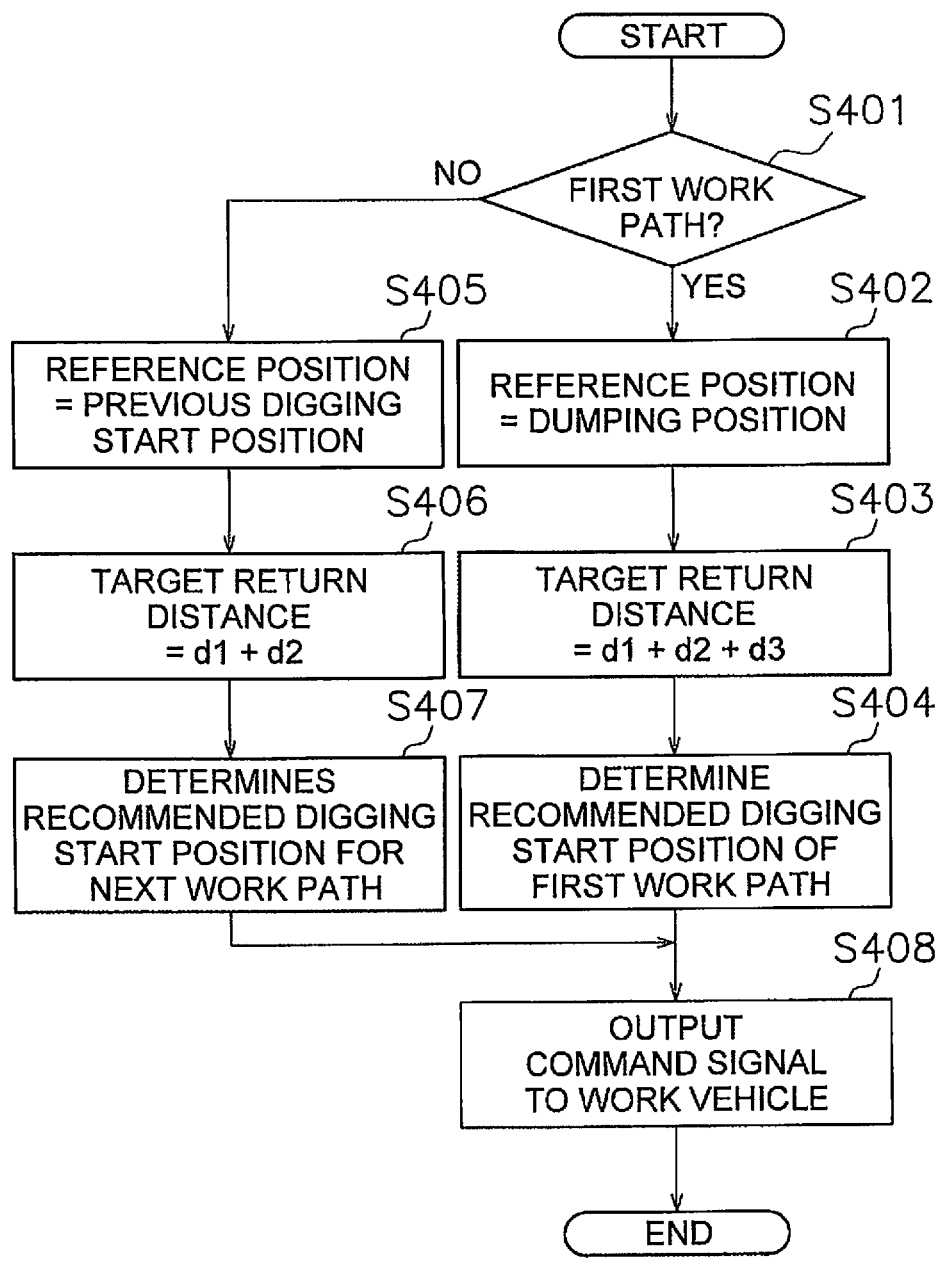
FIG. 16 is a flowchart showing a process for determining a recommended digging start position according to another embodiment.

In the above embodiment, the controller 26 determines the recommended digging start position, and displays the determined recommended digging start position on the guide screen 80 on the display 25*d*. However, as in step S408 illustrated in FIG. 16, the controller 26 may control the work vehicle 1 in accordance with the determined recommended digging start position. The processes of steps S401 to S407 in FIG. 16 are the same as the processes of steps S301 to S307 in FIG.

In step S408, the controller 26 outputs a command signal so that the work implement 13 starts the digging at the recommended digging start position. Alternatively, in step S408, the controller 26 may move the work vehicle 1 to the recommended digging start position and output a command signal so that the work implement 13 starts digging at the recommended digging start position. Alternatively, the display of the recommended digging start position in step S308 and the control of the work vehicle 1 in step S408 may be performed together.

Figure 17:
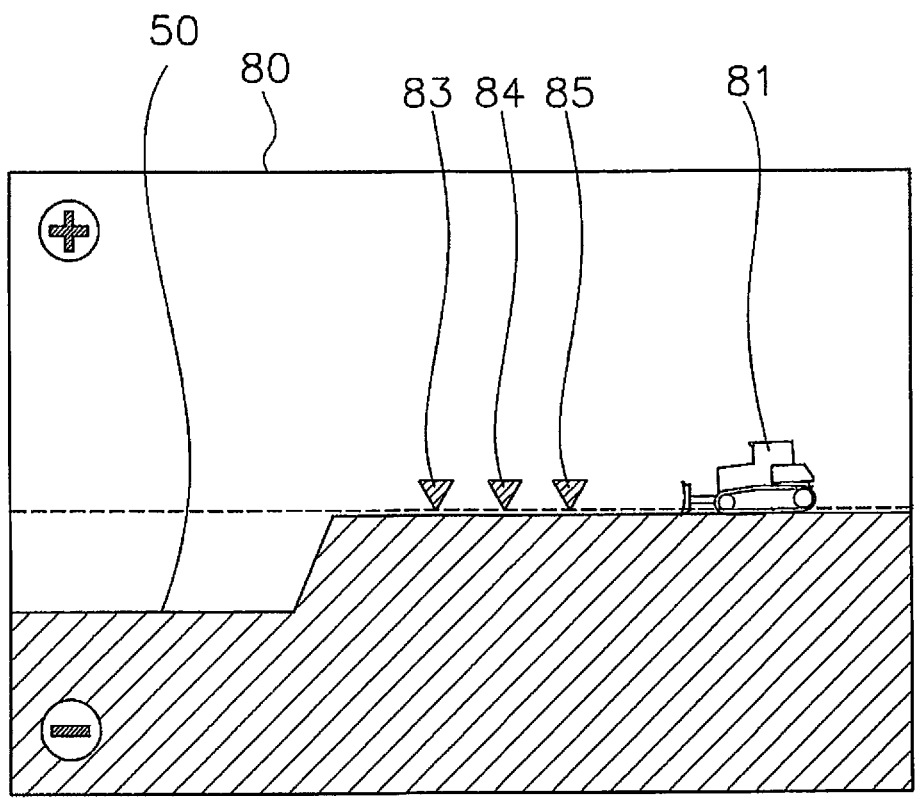
FIG. 17 is a view showing an example of a guide screen according to another embodiment.

On the guide screen 80, a plurality of recommended digging start positions may be displayed. For example, as illustrated in FIG. 17, icons 83 through 85 indicating a plurality of recommended digging start positions including an icon 83 indicating a recommended digging start position of the first work path and an icon 84 indicating a recommended digging start position of the second work path may be displayed on the guide screen 80.

In each work path, at least one value of the distance d1 of the digging area, the distance d2 of the digging start area, and the distance d3 of the soil transport transitional area may be updated, and based on the updated value, the recommended digging start position of the next work path may be determined. For example, as described above, when the first end value b2 of the digging area is updated, the distance d2 of the digging start area may be updated based on the updated first end value b2.

The controller 26 may determine the position set by the operation of the input device 25*c* by the operator as the digging start position. The method of determining the target return distance may be changed. The target return distance may be a function of parameters (such as d1, d2, d3, etc.) in the target parameter data other than those described in the above embodiments. For example, the controller 26 may determine the target return distance by multiplying the digging area distance d1 by a predetermined coefficient. Alternatively, the controller 26 may determine the target return distance by adding a predetermined constant to the distance d1 of the digging area.

The controller 26 may acquire the actual topography data within a range shorter than the predetermined topography recognition distance LA from the current position. That is, the controller 26 may acquire the actual topography data for only a part of the plurality of reference points Pn. The controller 26 may determine the target design topography 70 within a range shorter than the predetermined topography recognition distance LA from the current position. That is, the controller 26 may determine the target design topography 70 for only a part of the plurality of reference points Pn.

According to the present invention, it is possible to determine an appropriate digging start point by calculation by the controller and reduce the computational load on the controller.

The invention claimed is:

1. A control system for a work vehicle including a work implement, the control system comprising:
    a storage device configured to store target parameter data defining a relationship between a movement distance of the work vehicle and a target parameter correlated with a target digging soil amount of the work implement; and
    a controller in communication with the storage device, the target parameter data including
        start data that defines the relationship such that the target parameter increases as the movement distance increases, the start data corresponding to a digging start area spanning a first distance from a digging start position, and
        digging data that defines the relationship such that the target parameter remains at a constant value as the movement distance increases, the digging data corresponding to a digging area spanning a second distance from an end position of the digging start area, and
    the controller being configured to
        determine a target return distance from a sum of the first distance and the second distance,
        determine a recommended digging start position defined to be a position arrived at by returning from a predetermined reference position by the target return distance, and
        output a command signal to the work vehicle such that the work implement starts digging from the recommended digging start position.

2. The control system for a work vehicle according to claim 1, further comprising:
    an input device configured to output an operation signal indicative of an operation by an operator,
    the controller being further configured to
        receive the operation signal from the input device, and
        determine a position set by the operator using the input device as the reference position.

3. The control system for a work vehicle according to claim 1, further comprising:
    a position sensor configured to output a position signal indicative of a position of the work vehicle,
    the controller being further configured to
        receive the position signal from the position sensor,
        obtain a current digging start position from the position signal,
        determine the current digging start position as the reference position, and
        determine a position returned from the current digging start position by the target return distance as a next recommended digging start position.

4. The control system for a work vehicle according to claim 1, further comprising:
    a display in communication with the controller,
    the controller being further configured to output a display signal to the display, the display signal being indicative of a guide screen including
        a current position of the work vehicle,
        topography surrounding the work vehicle, and
        the recommended digging start position.

5. The control system for a work vehicle according to claim 1, wherein
    the target parameter data further includes transitional data defining the relationship such that the target parameter decreases as the movement distance increases, the transitional data corresponding to a transitional area spanning a third distance from an end position of the digging area, and the controller is further configured to determine the target return distance from a sum of the first distance, the second distance, and the third distance when digging a first work path.

6. The control system for a work vehicle according to claim 1, further comprising:
a position sensor configured to output a position signal indicative of a position of the work vehicle,
the controller being further configured to
receive the position signal from the position sensor,
obtain actual topography data indicative of actual topography to be worked,
obtain the movement distance of the work vehicle from the position signal,
determine the target parameter from the movement distance of the work vehicle with reference to the target parameter data,
determine target design topography in which the actual topography is displaced according to the target parameter, and
output a command signal to control the work implement according to the target design topography.

7. The control system for a work vehicle according to claim 1, wherein
the controller sets the digging start position of a current control cycle as the reference position of a subsequent control cycle.

8. The control system for a work vehicle according to claim 1, wherein
a value of the target parameter in the digging start data corresponding to the end position of the digging start area and the constant value of the target parameter in the digging data are the same.

9. A method implemented by a controller to determine a recommended digging start position of a work vehicle including a work implement, the method comprising:
referring to target parameter data that defines a relationship between a movement distance of the work vehicle and a target parameter correlated with a target digging soil amount of the work implement, the target parameter data including
start data that defines the relationship such that the target parameter increases as the movement distance increases, the start data corresponding to a digging start area spanning a first distance from a digging start position, and
digging data that defines the relationship such that the target parameter remains at a constant value as the movement distance increases, the digging data corresponding to a digging area spanning a second distance from an end position of the digging start area;
determining a target return distance from sum of the first distance and the second distance;
determining a recommended digging start position defined to be a position arrived at by returning from a predetermined reference position by the target return distance; and
outputting a command signal to the work vehicle such that the work implement starts digging from the recommended digging start position.

10. The method according to claim 9, further comprising:
receiving an operation signal indicative of an operation by an operator from an input device; and
determining a position set by the operator using the input device as the reference position.

11. The method according to claim 9, further comprising:
receiving a position signal indicative of a position of the work vehicle;
obtaining a current digging start position from the position signal; and
determining the current digging start position as the reference position,
the determining the recommended digging start position including determining a position returned from the current digging start position by the target return distance as a next recommended digging start position.

12. The method according to claim 9, further comprising:
outputting a display signal to the display, the display signal being indicative of a guide screen including
a current position of the work vehicle,
topography surrounding the work vehicle, and
the recommended digging start position.

13. The method according to claim 9, wherein
the target parameter data further includes transitional data defining the relationship such that the target parameter decreases as the movement distance increases, the transitional data corresponding to a transitional area spanning a third distance from an end position of the digging area, and
the determining the target return distance includes determining the target return distance from a sum of the first distance, the second distance, and the third distance when digging a first work path.

14. The method according to claim 9, further comprising:
receiving a position signal indicative of a position of the work vehicle;
obtaining actual topography data indicative of actual topography to be worked;
obtaining the movement distance of the work vehicle from the position signal;
determining the target parameter from the movement distance of the work vehicle with reference to the target parameter data;
determining target design topography in which the actual topography is displaced according to the target parameter; and
outputting a command signal to control the work implement according to the target design topography.

15. The method according to claim 9, further comprising:
setting the digging start position of a current control cycle as the reference position of a subsequent control cycle.

16. The method according to claim 9, further comprising:
a value of the target parameter in the digging start data corresponding to the end position of the digging start area and the constant value of the target parameter in the digging data are the same.

17. A work vehicle comprising:
a work implement; and
a controller configured to output a command signal to control the work implement, the controller being configured to
refer to target parameter data that defines a relationship between a travel distance of the work vehicle and a target parameter correlated with a target digging soil amount of the work implement, the target parameter data including
start data that defines the relationship such that the target parameter increases as the movement distance increases, the start data corresponding to a digging start area spanning a first distance from a digging start position, and digging data that defines the relationship such that the target parameter remains at a constant value as the movement distance increases, the digging data corresponding to a digging area spanning a second distance from an end position of the digging start area;

determine a target return distance from a sum of the first distance and the second distance, determine a recommended digging start position defined to be a position arrived at by returning from a predetermined reference position by the target return distance.

18. The work vehicle according to claim 17, further comprising:

an input device configured to output an operation signal indicative of an operation by an operator, the controller being further configured to
receive the operation signal from the input device, and
determine a position set by the operator using the input device as the reference position.

19. The work vehicle according to claim 17, further comprising:

a position sensor configured to output a position signal indicative of the position of the work vehicle, the controller being further configured to
receive the position signal from the position sensor,
obtain a current digging start position from the position signal,
determine the current digging start position as the reference position, and
determine a position returned from the current digging start position by the target return distance as a next recommended digging start position.

20. The work vehicle according to claim 17, further comprising:

a display in communication with the controller, the controller being further configured to output a display signal to the display, the display signal being indicative of a guide screen including
the current position of the work vehicle,
topography surrounding the work vehicle, and
the recommended digging start position.

21. The work vehicle according to claim 17, wherein the controller is further configured to output a command signal to the work vehicle such that the work vehicle moves to the recommended digging start position and the work implement starts digging at the recommended digging start position.

22. The work vehicle according to claim 17, wherein the target parameter data further includes transitional data defining the relationship such that the target parameter decreases as the movement distance increases, the transitional data corresponding to a transitional area spanning a third distance from an end position of the digging area, and the controller is further configured to determine the target return distance from a sum of the first distance, the second distance, and the third distance when digging a first work path.

* * * * *